United States Patent
Nakata et al.

(10) Patent No.: US 11,894,751 B2
(45) Date of Patent: Feb. 6, 2024

(54) DRIVE DEVICE

(71) Applicant: NIDEC CORPORATION, Kyoto (JP)

(72) Inventors: Keisuke Nakata, Kyoto (JP); Yuki Ishikawa, Kyoto (JP); Kouhei Oba, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 148 days.

(21) Appl. No.: 17/688,113

(22) Filed: Mar. 7, 2022

(65) Prior Publication Data

US 2022/0286016 A1 Sep. 8, 2022

(30) Foreign Application Priority Data

Mar. 8, 2021 (JP) ................. 2021-036144

(51) Int. Cl.
*H02K 5/20* (2006.01)
*H02K 5/173* (2006.01)
*H02K 9/193* (2006.01)
*H02K 7/08* (2006.01)
*B60K 1/00* (2006.01)
*B60K 1/04* (2019.01)

(52) U.S. Cl.
CPC .......... *H02K 5/203* (2021.01); *H02K 5/1732* (2013.01); *H02K 7/083* (2013.01); *H02K 9/193* (2013.01); *B60K 1/04* (2013.01); *B60K 2001/006* (2013.01)

(58) Field of Classification Search
CPC .... B60K 2001/006; B60K 1/04; H02K 5/203; H02K 5/1732; H02K 7/083; H02K 9/193
USPC .................................................... 310/54, 90
See application file for complete search history.

(56) References Cited

U.S. PATENT DOCUMENTS

| 9,777,607 | B2 | 10/2017 | Nagata et al. |
| 10,790,727 | B2 | 9/2020 | Inano et al. |
| 11,114,921 | B2 | 9/2021 | Ito et al. |
| 11,502,579 | B2* | 11/2022 | Nakamatsu ............ H02K 9/193 |
| 2022/0281310 | A1* | 9/2022 | Nakata ................ F16H 57/0457 |
| 2022/0307586 | A1* | 9/2022 | Fujimoto ............ F16H 57/0424 |

FOREIGN PATENT DOCUMENTS

JP 2019129609 A 8/2019

OTHER PUBLICATIONS

Unpublished U.S. Appl. No. 17/519,819, filed Nov. 5, 2021. 55pp.
Unpublished U.S. Appl. No. 17/519,820, filed Nov. 5, 2021. 96pp.

* cited by examiner

*Primary Examiner* — Terrance L Kenerly
(74) *Attorney, Agent, or Firm* — HAUPTMAN HAM, LLP

(57) ABSTRACT

A housing of a drive device includes a refrigerant flow path through which a refrigerant flows. The refrigerant flow path includes a first flow path, a second flow path, a third flow path, and a fourth flow path. The refrigerant to be sent from a pump flows through the first flow path. The refrigerant to be supplied to the motor portion flows in the second flow path. The third flow path supplies a part of the refrigerant flowing through the second flow path to the outer surface of a stator. The fourth flow path supplies the other part of the refrigerant flowing through the second flow path to a hollow portion of a shaft. A minimum flow-path cross-sectional area in the fourth flow path is smaller than a minimum flow-path cross-sectional area in the third flow path.

9 Claims, 10 Drawing Sheets

** DRIVE DEVICE

CROSS-REFERENCE TO RELATED APPLICATIONS

The present invention claims priority under 35 U.S.C. § 119 to Japanese Patent Application No. 2021-036144 filed on Mar. 8, 2021, the entire content of which is incorporated herein by reference.

FIELD OF THE INVENTION

The present invention relates to a drive device.

BACKGROUND

Conventionally, a drive device in which a branched oil flow path is formed is known. For example, the flow path is branched into a flow path connected to the inside of a rotor shaft and a cooling pipe.

However, in the above-mentioned drive device, an orifice is formed at the oil inlet of the cooling pipe. Therefore, if the cross-sectional area of the flow path inside the rotor shaft is large, the pressure is released and oil cannot be supplied to the cooling pipe.

SUMMARY

An exemplary drive device of the present invention includes a motor portion and a housing that accommodates the motor portion. The motor portion includes a rotor and a stator. The rotor includes a shaft. The shaft is rotatable about the rotation axis extending along the axial direction. The stator is disposed radially outward of the rotor. The shaft includes a shaft tubular portion and a hollow portion. The shaft tubular portion extends in the axial direction. The hollow portion is surrounded by the inner side surface of the shaft tubular portion. The housing includes a motor tubular portion, a motor accommodation space, and a refrigerant flow path. The motor tubular portion extends in the axial direction and surrounds the stator. The motor accommodation space is surrounded by the motor tubular portion to accommodate the motor. The refrigerant flows in the refrigerant flow path. The refrigerant flow path includes a first flow path, a second flow path, a third flow path, and a fourth flow path. The refrigerant to be sent from the pump flows through the first flow path. The refrigerant to be supplied to the motor portion flows through the second flow path. The third flow path supplies a part of the refrigerant flowing through the second flow path to the outer surface of the stator. The fourth flow path supplies another part of the refrigerant flowing through the second flow path to the hollow portion of the shaft. The minimum flow-path cross-sectional area in the fourth flow path is smaller than the minimum flow-path cross-sectional area in the third flow path.

The above and other elements, features, steps, characteristics and advantages of the present disclosure will become more apparent from the following detailed description of the preferred embodiments with reference to the attached drawings.

DETAILED DESCRIPTION

Figure 1:
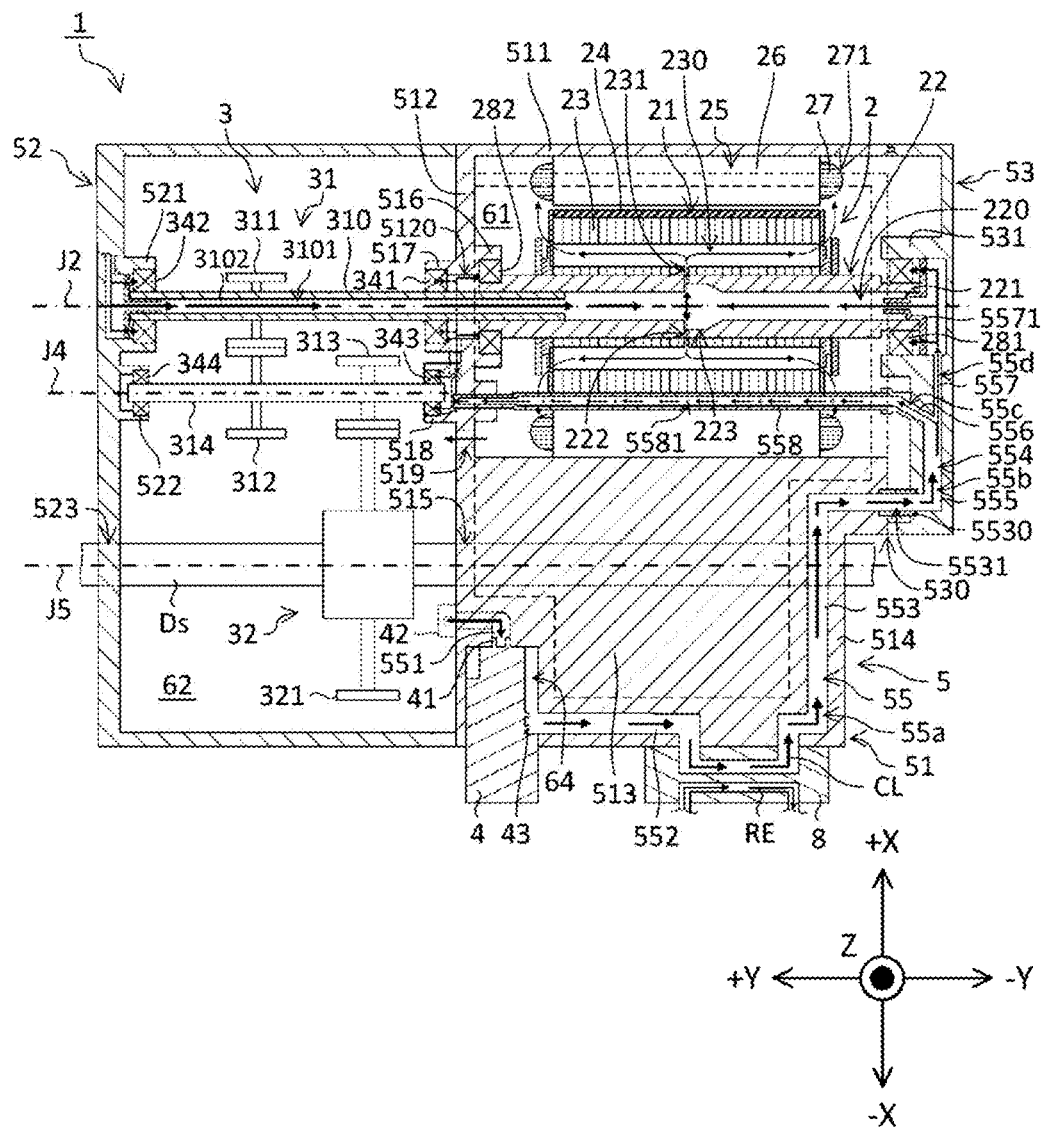
FIG. 1 is a schematic configuration view of a drive device viewed from a Z axis direction.

Hereinafter, exemplary embodiments will be described with reference to the drawings.

The following description will be made with the direction of gravity being partitioned based on a positional relationship in the case where a drive device 1 is mounted in a vehicle 200 located on a horizontal road surface. In addition, in the drawings, an XYZ coordinate system is shown appropriately as a three-dimensional orthogonal coordinate system. In the XYZ coordinate system, the Z axis direction indicates the vertical direction (i.e., up-down direction). The +Z direction is upward (vertically upward opposite to the gravity direction), and the −Z direction is downward (vertically downward in the same direction as the direction of gravity). The "Z axis direction" in the following description is an example of the "second direction" of the present invention. In each component, an end portion upward is referred to as an "upper end portion", and the position of the upper end portion in the axial direction is referred to as an "upper end". An end portion downward is referred to as a "lower end portion", and the position of the lower end portion in the axial direction is referred to as a "lower end". Among surfaces of each component, a surface facing the upper side is referred to as an "upper surface", and a surface facing the lower side is referred to as a "lower surface".

The X axis direction is a direction orthogonal to the Z axis direction and shows the front-rear direction of a vehicle 200 in which the drive device 1 is mounted. The "X axis direction" in the following description is an example of the "first direction" of the present invention. The +X direction is the front of the vehicle 200, and the −X direction is the rear of the vehicle 200. However, the +X direction can be the rear of the vehicle 200, and the −X direction can be the front of the vehicle 200.

A Y axis direction is a direction perpendicular to both the X axis direction and the Z axis direction, and indicates a width direction (i.e., a left-right direction) of the vehicle 200. The +Y direction is to the left of the vehicle 200, and the −Y direction is to the right of the vehicle 200. However, when the +X direction is the rear of the vehicle 200, the +Y direction can be the right of the vehicle 200, and the −Y direction can be the left of the vehicle 200. That is, regardless of the X axis direction, the +Y direction simply becomes one side in the right-left direction of the vehicle 200, and the −Y direction becomes the other side in the right-left direction of the vehicle 200. Depending on a method for mounting the drive device 1 on the vehicle 200, the X axis direction can be the width direction (right-left direction) of the vehicle 200, and the Y axis direction can be the front-rear direction of the vehicle 200. In the following embodiment, the Y axis direction is parallel to, for example, a rotation axis J2 of a motor portion 2. The "Y axis direction" in the following description is an example of the "axial direction" of the present invention. Further, the "+Y direction" is an example of the "one axial direction" of the present invention, and the "−Y direction" is an example of the "other axial direction" of the present invention.

Unless otherwise specified in the following description, the direction (Y axis direction) parallel to a predetermined axis such as the rotation axis J2 of the motor portion 2 is sometimes simply referred to as an "axial direction". Furthermore, a direction orthogonal to a predetermined axis is simply referred to as a "radial direction", and a circumferential direction about a predetermined axis is referred to as a "circumferential direction". Of the radial direction, an orientation approaching an axis is referred to as "radially inward", and an orientation separating from the axis is referred to as "radially outward". In each component, an end portion radially inward is referred to as a "radially inner end portion". Furthermore, an end portion outward is referred to as a "radially outer end portion". Further, in side surfaces of each component, a side surface facing the radially inner side is referred to as a "radially inner surface", and a side surface facing the radially outer side is referred to as a "radially outer surface".

In this specification, an "annular shape" includes not only a shape continuously connected without any cut along the entire circumference in the circumferential direction around the central axis CA but also a shape having one or more cuts in a part of the entire circumference around the central axis CA. Further, the "annular shape" also includes a shape having a closed curve around the central axis CA on a curved surface that intersects with the central axis CA.

In a positional relationship between any one and another of the azimuth, the line, and the surface, "parallel" includes not only a state in which the two endlessly extend without intersecting at all but also a state in which the two are substantially parallel. Further, "orthogonal" and "perpendicular" include not only a state where the two intersect each other at 90 degrees, but also a state where the two are substantially orthogonal and a state where the two are substantially perpendicular. That is, the terms "parallel", "perpendicular", and "orthogonal" each include a state in which the positional relationship between both has an angular deviation that does not depart from the gist of the present invention.

Note that these are names used merely for description, and are not intended to limit actual positional relationships, directions, names, and the like.

Figure 2:
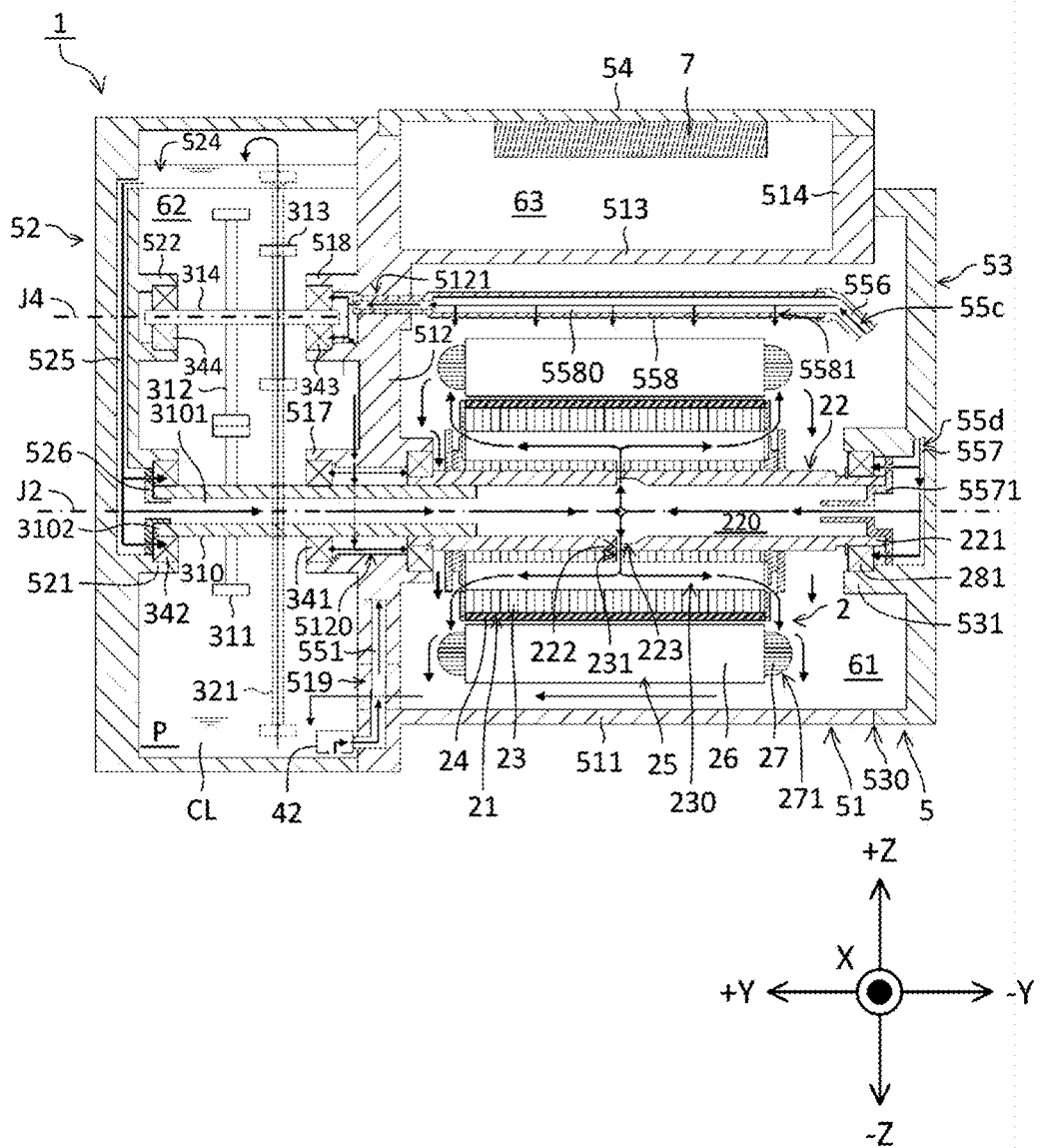
FIG. 2 is a schematic configuration view of the drive device viewed from an X axis direction.
Figure 3:
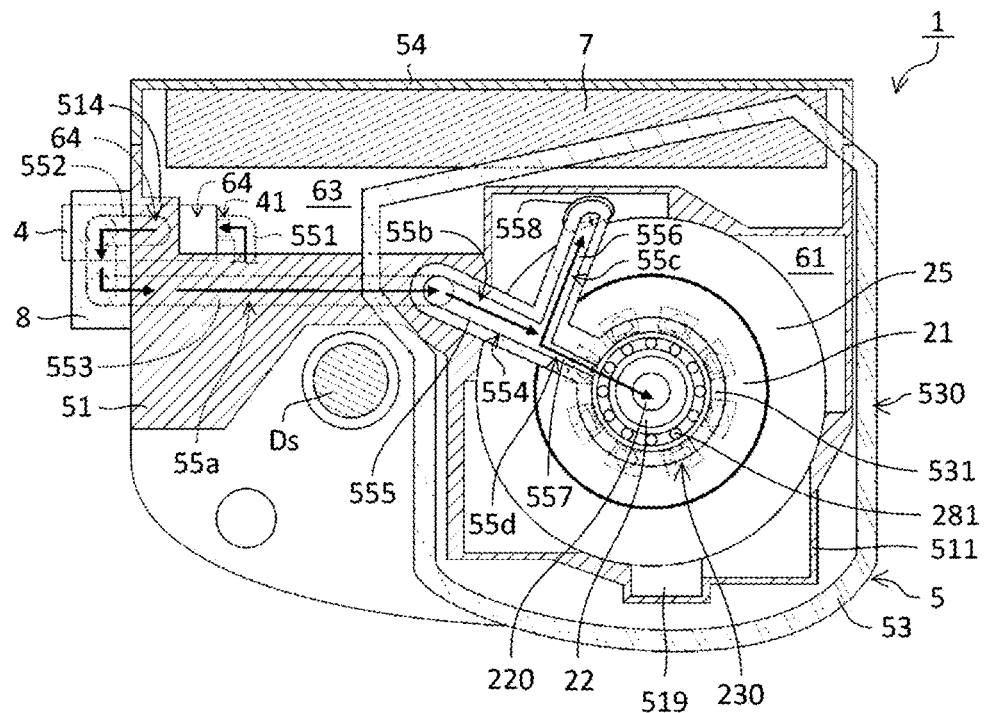
FIG. 3 is a schematic configuration view of the drive device viewed from a Y axis direction.
Figure 4:
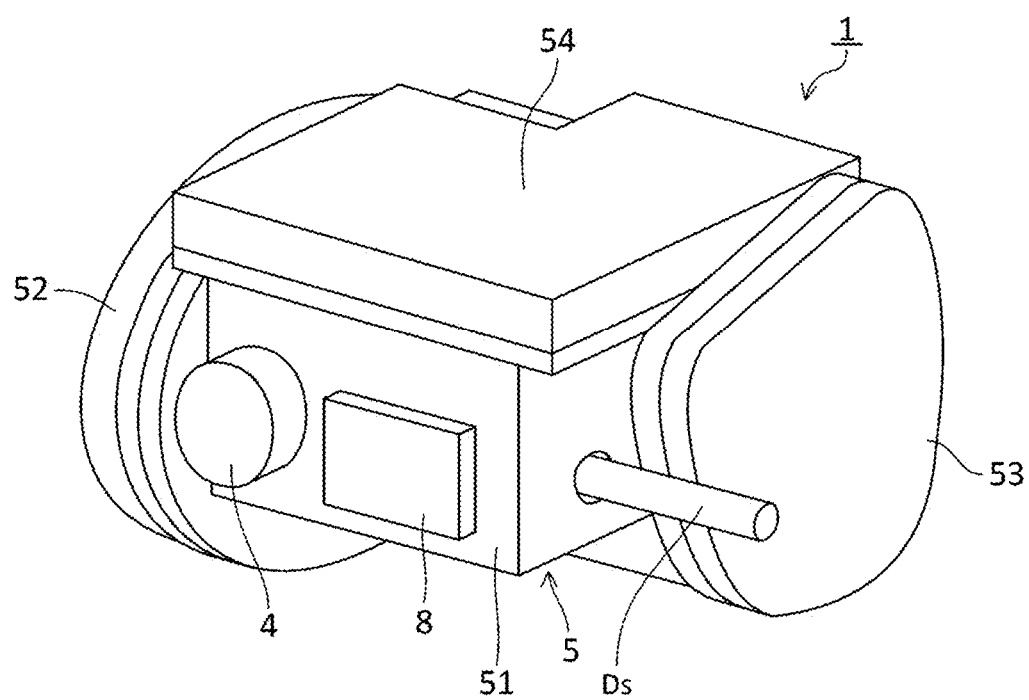
FIG. 4 is a perspective view of the drive device.
Figure 5:
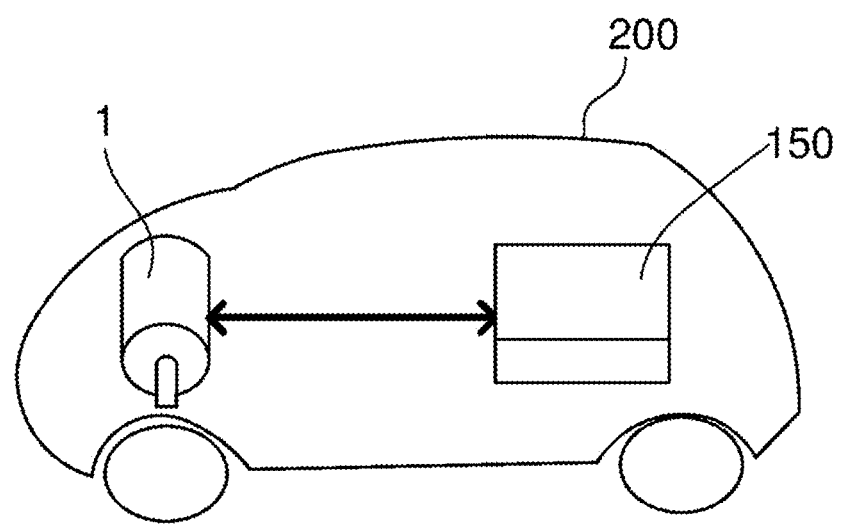
FIG. 5 is a schematic view illustrating an example of a vehicle having the drive device.

The drive device 1 according to an exemplary embodiment of the present invention will be described below with reference to the drawings. FIGS. 1 to 3 are conceptual views of the drive device 1 according to an embodiment. FIG. 1 is a schematic configuration view of the drive device 1 viewed from a Z axis direction. FIG. 2 is a schematic configuration view of the drive device 1 viewed from the X axis direction. FIG. 3 is a schematic configuration view of the drive device 1 viewed from the Y axis direction. FIG. 4 is a perspective view of the drive device 1. FIG. 5 is a schematic view illustrating an example of a vehicle 200 having the drive device 1. Note that FIGS. 1 to 5 are merely conceptual views, and the layout and dimensions of each portion are not necessarily the same as those of the actual drive device 1.

The drive device 1 is mounted on the vehicle 200 such as a hybrid vehicle (HV), a plug-in hybrid vehicle (PHV), and an electric vehicle (EV) in which at least the motor is used as a power source. The drive device 1 is used as the power source of the above-described vehicle 200. The vehicle 200 includes the drive device 1 and a battery 150. The battery 150 stores electric power to be supplied to the drive device 1. In the example of the vehicle 200, the drive device 1 drives the right and left front wheels. The drive device 1 is only required to drive at least any of the wheels.

As illustrated in FIG. 1, the drive device 1 includes the motor portion 2, a gear portion 3, a pump 4, a housing 5, and an oil cooler 8. The motor portion 2 includes a rotor 21 having a motor shaft 22 and a stator 25 located radially outward of the rotor 21. The motor shaft 22 is rotatable about the rotation axis J2 extending along the Y axis direction. The motor shaft 22 is an example of the "shaft" of the present invention, and the Y axis direction is an example of the "axial direction" of the present invention as described above. The gear portion 3 is connected to the end portion of the motor shaft 22 in the +Y direction. The housing 5 accommodates the motor portion 2 and the gear portion 3. The pump 4 supplies an oil CL accommodated in the housing 5 to the motor portion 2. As described above, the drive device 1 includes the pump 4. The oil cooler 8 cools the oil CL. The oil cooler 8 cools the oil CL supplied from the pump 4 to the motor portion 2 in the present embodiment.

The drive device 1 further includes an inverter unit 7. The inverter unit 7 supplies drive electric power to the motor portion 2.

The inside of the housing 5 is provided with an accommodation space that accommodates the motor portion 2, the gear portion 3, the pump 4, and the inverter unit 7. As described later, this accommodation space is partitioned into a motor accommodation portion 61 that accommodates the motor portion 2, a gear accommodation portion 62 that accommodates the gear portion 3, an inverter accommodation portion 63 that accommodates the inverter unit 7, and a pump accommodation portion 64 that accommodates the pump 4. The inverter unit 7 is integrally fixed to a fourth housing member 54 described later.

The motor portion 2 is accommodated in the motor accommodation portion 61 of the housing 5. The motor portion 2 includes the rotor 21 and the stator 25.

When electric power is supplied from a battery (not illustrated) to the stator 25, the rotor 21 rotates about the rotation axis J2 extending in the horizontal direction. The rotor 21 further includes a rotor core 23 and a rotor magnet 24 in addition to the motor shaft 22.

The motor shaft 22 extends along the rotation axis J2. The motor shaft 22 rotates about the rotation axis J2. The motor shaft 22 is rotatably supported by a first motor bearing 281 and a second motor bearing 282. The first motor bearing 281 is, for example, a ball bearing and is held by a third housing member 53 described later in the housing 5. The second motor bearing 282 is, for example, a ball bearing, and is held by a side plate portion 512 described later in the housing 5.

The motor shaft 22 is a tubular hollow shaft. The motor shaft 22 includes a hollow portion 220 and a shaft tubular portion 221 extending in the Y axis direction. The hollow portion 220 is surrounded by the inner side surface of the shaft tubular portion and is connected to a third supply passage 557 (fourth flow path 55d) described later. Specifically, the hollow portion 220 is connected to the third supply passage 557 (fourth flow path 55d) at the end portion of the shaft tubular portion on the −Y direction side. The motor shaft 22 further includes a shaft hole portion 222. The shaft hole portion 222 penetrates the shaft tubular portion 221 in the radial direction.

A hollow transmission shaft 310 of the gear portion 3 described later is inserted and connected to the end portion of the motor shaft 22 on the +Y direction side. In the present embodiment, the both are connected by spline fitting. Alternatively, the both may be joined by a fixing method such as welding. The hollow portion 220 of the motor shaft 22 communicates with a hollow portion 3101 of the transmission shaft 310 described later and a first motor bearing holding portion 531 that accommodates the first motor bearing 281.

The rotor core 23 is a columnar body extending along the Y axis direction. The rotor core 23 is fixed to the radial outside surface of the motor shaft 22. As mentioned earlier, the rotor 21 includes the rotor core 23. A plurality of rotor magnets 24 are fixed to the rotor core 23. The plurality of rotor magnets 24 are aligned along the circumferential direction with the magnetic poles arranged alternately.

The rotor core 23 includes a rotor through hole 230. The rotor through hole 230 penetrates the rotor core 23 in the Y axis direction and is connected to the shaft hole portion 222. The rotor through hole 230 is connected to the third supply passage 557 (fourth flow path 55d) via the hollow portion 220. Specifically, the rotor core 23 includes a rotor communication portion 231. The rotor communication portion 231 is a space penetrating the rotor through hole 230 from the radially inner surface of the rotor core 23, and connects the rotor through hole 230 and the shaft hole portion 222. The rotor through hole 230 is used as a circulation path for the oil CL that cools the rotor 21 from inside. The oil CL circulating through the hollow portion 220 of the motor shaft 22 can flow into the rotor through hole 230 via the shaft hole portion 222 and the rotor communication portion 231 as described later. In this way, when the rotor 21 rotates, the oil CL flows out from the end portion of the rotor through hole 230 in the Y axis direction. This oil CL is supplied to the end portion of the stator 25 in the Y axis direction by centrifugal force due to the rotation of the rotor 21, and is particularly supplied to a coil end 271 described later, which is disposed at the end portion of the stator 25 in the Y axis direction. This oil CL can cool the end portion of the stator 25 in the Y axis direction, especially the coil end 271 of the stator 25.

The stator 25 surrounds the rotor 21 from the outside in the radial direction and rotationally drives the rotor 21. As described above, the stator 25 is disposed radially outward of the rotor 21. That is, the motor portion 2 is an inner rotor motor in which the rotor 21 is disposed inside the stator 25 so as to be rotatable. The stator 25 includes a stator core 26, a coil 27, and an insulator (not illustrated) arranged between the stator core 26 and the coil 27. The stator 25 is held by the housing 5. The stator core 26 includes a plurality of magnetic pole teeth (not illustrated) radially inward from an inner peripheral surface of an annular yoke.

A coil wire is wound between the magnetic pole teeth. The coil wire wound around the magnetic pole teeth constitutes the coil 27. The coil wire is connected to the inverter unit 7 via a bus bar not illustrated. The coil 27 includes a coil end 271 protruding from the axial end surface of the stator core 26. The coil end 271 protrudes in the axial direction relative to the end portion of the rotor core 23 of the rotor 21.

Next, the gear portion 3 transmits the driving force of the motor portion 2 to a drive shaft Ds that drives wheels of the vehicle 200. Details of the gear portion 3 will be described with reference to the drawings. As illustrated in FIG. 1 and the like, the gear portion 3 is accommodated in the gear accommodation portion 62 of the housing 5. The gear portion 3 includes a deceleration device 31 and a differential device 32.

The deceleration device 31 is connected to the motor shaft 22. The deceleration device 31 reduces the rotational speed of the motor portion 2, increases the torque output from the motor portion 2 according to the reduction ratio, and transmits the increased torque to the differential device 32.

The deceleration device 31 includes the transmission shaft 310, a first gear (intermediate drive gear) 311, a second gear (intermediate gear) 312, a third gear (final drive gear) 313, and an intermediate shaft 314. The torque output from the motor portion 2 is transmitted to a fourth gear 321 of the differential device 32 via the motor shaft 22, the transmission shaft 310, the first gear 311, the second gear 312, the intermediate shaft 314, and the third gear 313. The gear ratio of each gear, the number of gears, and the like can be variously changed according to the required reduction ratio. The deceleration device 31 is a parallel axis gear type deceleration device in which the axis centers of the gears are disposed in parallel. The motor shaft 22 and the transmission shaft 310 are spline-fitted.

The transmission shaft 310 extends in the Y axis direction about the rotation axis J2 and rotates about the rotation axis J2 together with the motor shaft 22. The motor shaft 22 is rotatably supported by a first gear bearing 341 and a second gear bearing 342. The first gear bearing 341 is, for example, a ball bearing, and is held by the side plate portion 512 of the housing 5 as described later. The second gear bearing 342 is, for example, a ball bearing, and is held by a second housing member 52 described later.

The transmission shaft 310 is a tubular hollow shaft. The transmission shaft 310 includes a hollow portion 3101 and a transmission shaft tubular portion 3102 of a tubular shape extending in the Y axis direction. The hollow portion 3101 is surrounded by the inner side surface of the transmission shaft tubular portion 3102, and is connected to a gear-side oil passage 525 described later at the end portion of the transmission shaft tubular portion 3102 on the +Y direction side. The −Y direction side end portion of the transmission shaft tubular portion 3102 is connected to the end portion of the motor shaft 22 on the +Y direction side. Further, the end portion of the transmission shaft tubular portion 3102 on the +Y direction side is rotatably held by a second gear bearing holding portion 521 via the second gear bearing 342.

Note that the present invention is not limited to the example of the present embodiment, and the transmission shaft 310 may be the same member as the motor shaft 22, that is, may be integrated. In other words, the motor shaft 22 may be a hollow shaft extending across the motor accommodation portion 61 and the gear accommodation portion 62 of the housing 5. In this case, the +Y direction side end portion of the motor shaft 22 protrudes on the gear accommodation portion 62 side and is rotatably supported by the second gear bearing 342. The hollow portion 220 of the motor shaft 22 communicates with the first motor bearing holding portion 531 that accommodates the first motor bearing 281 and the second gear bearing holding portion 521 that accommodates the second gear bearing 342.

The first gear 311 is provided on the outer circumferential surface of the transmission shaft 310. The first gear 311 may be the same member as or a different member from the transmission shaft 310. When the first gear 311 and the transmission shaft 310 are separate members, the first gear 311 and the transmission shaft 310 are firmly fixed by shrink fitting or the like. The first gear 311 is rotatable about the rotation axis J2 together with the transmission shaft 310.

The intermediate shaft 314 extends along an intermediate axis J4 parallel to the rotation axis J2 and is rotatably supported by the housing 5 about the intermediate axis J4.

Both ends of the intermediate shaft 314 are rotatably supported by a third gear bearing 343 and a fourth gear bearing 344. The third gear bearing 343 is, for example, a ball bearing, and is held by the side plate portion 512 of the housing 5. The fourth gear bearing 344 is, for example, a ball bearing, and is held by the second housing member 52.

The second gear 312 and the third gear 313 are provided on the outer circumferential surface of the intermediate shaft 314. The second gear 312 and the third gear 313 may be the same members as or different members from the intermediate shaft 314. When the second gear 312 and the intermediate shaft 314 are separate members, they are firmly fixed by shrink fitting or the like. When the third gear 313 and the intermediate shaft 314 are separate members, they are firmly fixed by shrink fitting or the like. The third gear 313 is disposed closer to the side plate portion 512 than the second gear 312 (i.e., in the −Y direction). The second gear 312 and the third gear 313 are connected to each other with the intermediate shaft 314 interposed therebetween. The second gear 312 and the third gear 313 are rotatable about the intermediate axis J4. The second gear 312 meshes with the first gear 311. The third gear 313 meshes with the fourth gear 321 of the differential device 32.

The torque of the transmission shaft 310 is transmitted from the first gear 311 to the second gear 312. The torque transmitted to the second gear 312 is transmitted to the third gear 313 via the intermediate shaft 314. The torque transmitted to the third gear 313 is transmitted to the fourth gear 321 of the differential device 32. In this manner, the deceleration device 31 transmits, to the differential device 32, the torque output from the motor portion 2.

The differential device 32 is attached to the drive shaft Ds. The differential device 32 transmits the output torque of the motor portion 2 to the drive shaft Ds. The drive shaft Ds is attached to each of the right and left sides of the differential device 32. The differential device 32 has a function of transmitting the same torque to the right and left drive shafts Ds while absorbing a speed difference between the right and left wheels (drive shafts Ds) when the vehicle 200 turns, for example. The differential device 32 includes, for example, a fourth gear (ring gear) 321, a gear housing (not illustrated), a pair of pinion gears (not illustrated), a pinion shaft (not illustrated), and a pair of side gears (not illustrated).

The fourth gear 321 is rotatable about a differential axis J5 parallel to the rotation axis J2. Torque output from the motor portion 2 is transmitted to the fourth gear 321 via the deceleration device 31. Further, the portion of the fourth gear 321 on the −Z direction side is immersed in the lower oil pool P in the gear accommodation portion 62. For example, the oil CL is scraped up by the tooth surface of the fourth gear 321 when the fourth gear 321 of the differential device 32 rotates. A part of the oil is supplied to the inside of the gear accommodation portion 62 and is used for lubricating the gears and bearings of the speed deceleration device 31 and the differential device 32 in the gear accommodation portion 62. Further, the other part of the scraped-up oil CL is stored in a saucer portion 524 described later, and then supplied to the hollow portion 220 of the motor shaft 22 through the hollow portion 3101 of the gear-side oil passage 525 and the transmission shaft 310 described later so as to be used to cool the stator 25.

Next, the pump 4 is an electric pump driven by electricity, and is connected to the inverter unit 7 via a harness cable (not illustrated). That is, the pump 4 is driven by the inverter unit 7. As the pump 4, a trochoidal pump, a centrifugal pump, or the like can be employed. The pump 4 is provided in the pump accommodation portion 64 formed in the housing 5. For example, the pump 4 is fixed to the housing 5 with a bolt (not illustrated).

A suction port 41 of the pump 4 is inserted into a first oil passage 551 so as to close the first oil passage 551 described later. The suction port 41 of the pump 4 is connected to a strainer 42 via the first oil passage 551 described later. The strainer 42 is disposed in the gear accommodation portion 62 of the housing 5. The strainer 42 is disposed in the oil pool P (see FIG. 2 and the like) of the gear accommodation portion 62 described later. The strainer 42 sucks the oil CL by drive of the pump 4 from an inlet (not illustrated) disposed on the lower surface thereof and supplies the oil CL to the suction port 41 of the pump 4. A filtration structure (not illustrated) such as a filter is attached to the strainer 42. By attaching the filtration structure, it is possible to suppress mixing of foreign matters into the pump 4 and mixing of foreign matters into the motor portion 2.

A discharge port 43 of the pump 4 opens to the pump accommodation portion 64. That is, the oil CL protruding from the pump 4 fills the pump accommodation portion 64. A second oil passage 552 described later is connected to the pump accommodation portion 64. The pump 4 discharges the oil CL sucked from the suction port 41 from the discharge port 43 and sends the oil CL to the oil cooler 8 via the second oil passage 552.

The oil cooler 8 performs heat exchange between the oil CL sent from the pump 4 via the second oil passage 552 and a refrigerant RE supplied in a system different from a motor-side oil passage 55 described later including the second oil passage 552. Thus, the oil cooler 8 cools the oil CL to be sent from the pump 4. The oil CL cooled by the oil cooler 8 is supplied to the motor portion 2 via a third oil passage 553 and a fourth oil passage 554 described later. The refrigerant RE is supplied to the oil cooler 8 after cooling an IGBT, an SIC element, and the like (not illustrated) of the inverter unit 7.

The pump accommodation portion 64 is formed in a peripheral wall portion 514 surrounding the inverter accommodation portion 63 (see FIG. 3). For example, the pump accommodation portion 64 can be disposed using a dead space other than the space occupied by the inverter unit 7 in the inverter accommodation portion 63. This allows the pump 4 to be compactly disposed, which can contribute to downsizing of the drive device 1.

Figure 6:
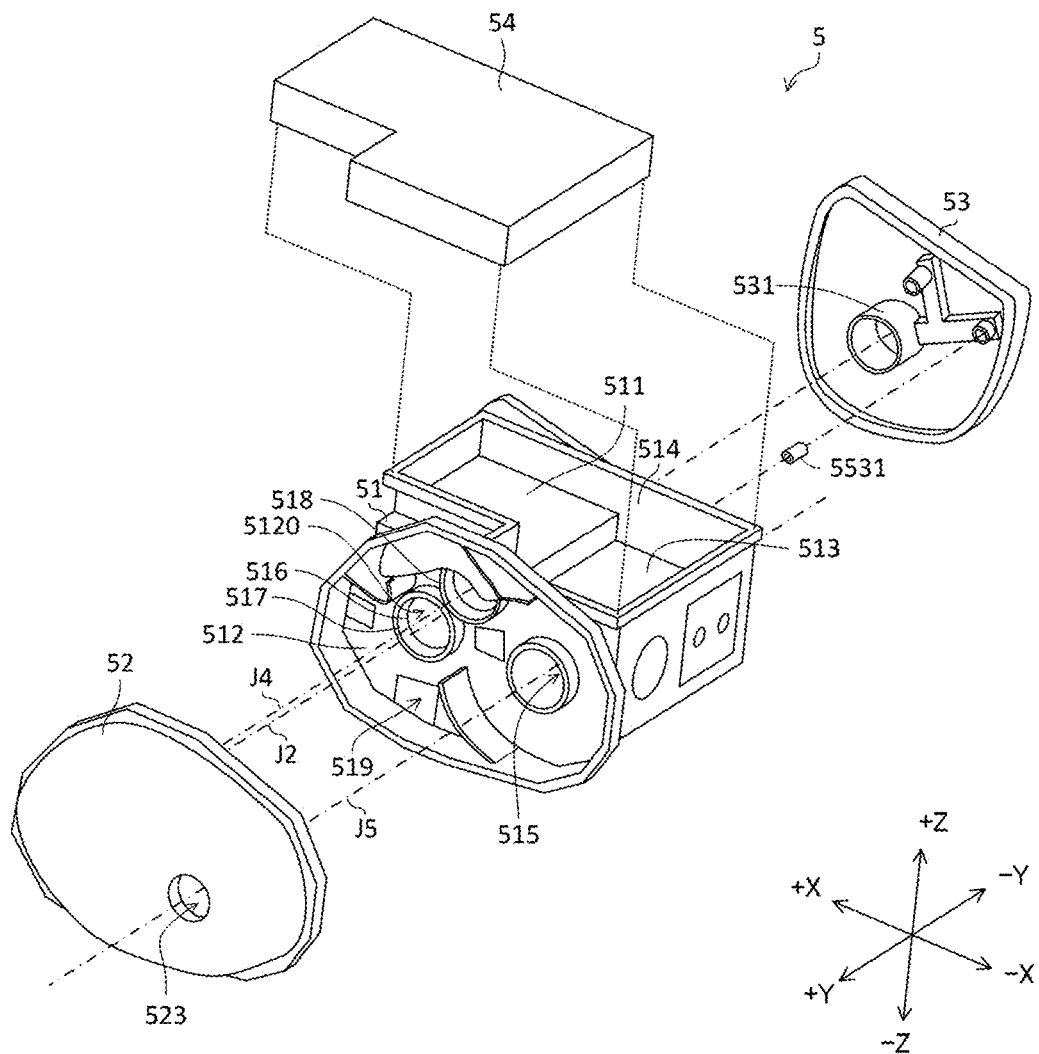
FIG. 6 is an exploded perspective view of a housing.

Next, the configuration of the housing 5 will be described. FIG. 6 is an exploded view of the housing 5. As illustrated in FIG. 6, the housing 5 includes a first housing member 51. The first housing member 51 includes a tubular portion 511 of a tubular shape. That is, the housing 5 includes the tubular portion 511. The tubular portion 511 extends in the Y axis direction and surrounds the stator 25. The tubular portion 511 is an example of the "motor tubular portion" of the present invention. Further, the first housing member 51 further includes a side plate portion 512. That is, the housing 5 includes the side plate portion 512. The side plate portion 512 covers the end portion of the tubular portion 511 on the +Y direction side. In the present embodiment, the tubular portion 511 and the side plate portion 512 are the identical member. However, the present invention is not limited to this example, and the tubular portion 511 and the side plate portion 512 may be different members.

The housing 5 further includes the second housing member 52. The second housing member 52 is attached to the end portion of the side plate portion 512 on the +Y direction side. The second housing member 52 and the side plate portion 512 constitute the gear accommodation portion 62 which will be described later.

The housing 5 further includes the third housing member 53. The third housing member 53 is an example of the "motor lid portion" of the present invention. The third housing member 53 is attached to the end portion of the tubular portion 511 on the −Y direction side. The end portion on the −Y direction side corresponds to the "one axial end portion" of the present invention. The third housing member 53 closes and shuts the end portion of the tubular portion 511 on the −Y direction side.

As illustrated in FIG. 3, a contact portion 530 in which the third housing member 53 contacts the tubular portion 511 is annular when viewed from the Y axis direction. The housing 5 includes a continuous contact portion 530 in which the tubular portion 511 and the third housing member 53 are in contact with each other. The third housing member 53 includes the first motor bearing 281 that rotatably supports the shaft tubular portion 221. Note that the first motor bearing 281 is an example of a "bearing" of the present invention. Further, the third housing member 53 includes the first motor bearing holding portion 531 that holds the first motor bearing 281. Note that the first motor bearing holding portion 531 is an example of a "bearing holding portion" of the present invention. The first motor bearing holding portion 531 rotatably supports the end portion of the motor shaft 22 on the −Y direction side via the first motor bearing 281.

The housing 5 further includes the fourth housing member 54. The fourth housing member 54 is disposed vertically above the tubular portion 511. The vertically upward direction is perpendicular to the Y axis direction. The fourth housing member 54 is attached to an upper portion of the first housing member 51.

Further, the housing 5 further includes the motor accommodation portion 61. The motor accommodation portion 61 is surrounded by the tubular portion 511 and accommodates the motor portion 2. The motor accommodation portion 61 is an example of the "motor accommodation space" of the present invention. Specifically, the motor accommodation portion 61 is a space surrounded by the tubular portion 511, the side plate portion 512, and the third housing member 53, and accommodates the motor portion 2.

Further, the housing 5 further includes the gear accommodation portion 62. The gear accommodation portion 62 is a space surrounded by the side plate portion 512 and the second housing member 52, and accommodates the gear portion 3. At the lower part of the gear accommodation portion 62 in the vertical direction, there is the oil pool P in which the oil CL is accumulated. The motor accommodation portion 61 and the gear accommodation portion 62 are partitioned by the side plate portion 512.

The housing 5 further includes the inverter accommodation portion 63 that accommodates the inverter unit 7. The inverter accommodation portion 63 is a space surrounded by the tubular portion 511, a plate portion 513 described later, and the peripheral wall portion 514 described later. The inverter accommodation portion 63 opens in the +Z direction. The opening is covered with the fourth housing member 54. The inverter unit 7 is integrally fixed to the fourth housing member 54. That is, the inverter unit 7 is fixed downward to the inverter accommodation portion 63 by integrally fixing the inverter unit 7 to the lower side of the fourth housing member 54. The fourth housing member 54 may be provided with an inverter cooling path (not illustrated).

Further, the housing 5 includes the pump accommodation portion 64. The pump accommodation portion 64 accommodates the pump 4. The pump accommodation portion 64 is formed in the first housing member 51. That is, the first housing member 51 further includes the pump accommodation portion 64.

Next, the first housing member 51 further includes the plate portion 513 and the peripheral wall portion 514. That is, the housing 5 includes the plate portion 513 and the peripheral wall portion 514. The plate portion 513 expands from the tubular portion 511 in the X axis direction perpendicular to the Y axis direction. The peripheral wall portion 514 surrounds the inverter accommodation portion 63 when viewed from the Y axis direction and the Z axis direction perpendicular to the X axis direction. Specifically, the plate portion 513 extends in the −X direction from the outer surface of the tubular portion 511. The peripheral wall portion 514 protrudes in the +Z direction from the upper end portion of the tubular portion 511 and the plate portion 513, and surrounds the inverter accommodation portion 63 when viewed from the vertical direction (see FIG. 1).

The first housing member 51 further includes an insertion hole 5120, a first drive shaft passage hole 515, a second motor bearing holding portion 516, a first gear bearing holding portion 517, a third gear bearing holding portion 518, and a side plate opening 519.

The insertion hole 5120 and the first drive shaft passage hole 515 are disposed in the side plate portion 512 and penetrate the side plate portion 512 in the Y axis direction. The center of the insertion hole 5120 coincides with the rotation axis J2. The second motor bearing holding portion 516 is disposed on the −Y direction side of the insertion hole 5120. The first gear bearing holding portion 517 is disposed on the +Y direction side of the insertion hole 5120.

The drive shaft Ds penetrates through the first drive shaft passage hole 515 in a rotatable state. A second drive shaft passage hole 523 is disposed in the second housing member 52. The second drive shaft passage hole 523 is a hole penetrating the second housing member 52 in the axial direction. The drive shaft Ds rotatably penetrates the second drive shaft passage hole 523. The second drive shaft passage hole 523 overlaps the first drive shaft passage hole 515 when viewed from the axial direction. Consequently, the drive shaft Ds disposed at both ends in the axial direction (Y direction) of the differential device 32 rotates about the differential axis J5. An oil seal (not illustrated) is provided between the drive shaft Ds and the first drive shaft passage hole 515 and between the drive shaft Ds and the second drive shaft passage hole 523 in order to suppress leakage of the oil CL. An axle (not illustrated) that rotates the wheel is connected to a front end of the drive shaft Ds.

The second motor bearing holding portion 516 extends in the −Y direction from the edge portion of the insertion hole 5120. An outer ring of the second motor bearing 282 is fixed to the second motor bearing holding portion 516. The +Y direction side end portion of the motor shaft 22 is fixed to the inner ring of the second motor bearing 282. The first motor bearing holding portion 531 is disposed on the +Y direction side of the third housing member 53. The central axes of the first motor bearing holding portion 531 and the second motor bearing holding portion 516 each coincide with the rotation axis J2. An outer ring of the first motor bearing 281 is fixed to the first motor bearing holding portion 531. The −Y direction side end portion of the motor shaft 22 is fixed to the inner ring of the first motor bearing 281. As a result, both ends of the rotor 21 in the Y axis direction of the motor portion 2 are rotatably supported by the housing 5 via the first motor bearing 281 and the second motor bearing 282.

The first gear bearing holding portion 517 extends in the +Y direction from the edge portion of the insertion hole

5120. An outer ring of the first gear bearing 341 is fixed to the first gear bearing holding portion 517. The −Y direction side end portion of the transmission shaft 310 is fixed to the inner ring of the first gear bearing 341. The second gear bearing holding portion 521 is disposed on the −Y direction side of the second housing member 52. The central axes of the second gear bearing holding portion 521 and the first gear bearing holding portion 517 coincide with the rotation axis J2. An outer ring of the second gear bearing 342 is fixed to the second gear bearing holding portion 521. The transmission shaft 310 is fixed to the inner ring of the second gear bearing 342. As a result, the transmission shaft 310 is rotatably supported by the side plate portion 512 of the housing 5 and the second housing member 52 via the first gear bearing 341 and the second gear bearing 342.

Next, the third gear bearing holding portion 518 has a tubular shape extending in the +Y direction from the side plate portion 512. The third gear bearing holding portion 518 is disposed in the −X direction and the +Z direction with respect to the first gear bearing holding portion 517. An outer ring of the third gear bearing 343 is fixed to the third gear bearing holding portion 518. The intermediate shaft 314 is fixed to the inner ring of the third gear bearing 343. A fourth gear bearing holding portion 522 is disposed on the −Y direction side of the second housing member 52. The fourth gear bearing holding portion 522 has a tubular shape extending in the −Y direction from the second housing member 52. The central axes of the third gear bearing holding portion 518 and the fourth gear bearing holding portion 522 coincide with the intermediate axis J4. An outer ring of the fourth gear bearing 344 is fixed to the fourth gear bearing holding portion 522. The +Y direction side end portion of the intermediate shaft 314 is fixed to the inner ring of the fourth gear bearing 344. As a result, the intermediate shaft 314 is rotatably supported by the side plate portion 512 of the housing 5 and the second housing member 52 via the third gear bearing 343 and the fourth gear bearing 344.

The side plate opening 519 is provided in the side plate portion 512 that partitions the motor accommodation portion 61 and the gear accommodation portion 62. The housing 5 includes the side plate opening 519. The side plate opening 519 penetrates the side plate portion 512 in the axial direction and connects the motor accommodation portion 61 and the gear accommodation portion 62. The side plate opening 519 causes in particular the lower portion of the motor accommodation portion 61 and the lower portion of the gear accommodation portion 62 to communicate with each other. The side plate opening 519 allows the oil CL accumulated in the lower portion in the motor accommodation portion 61 to move to the gear accommodation portion 62. The oil CL having moved to the gear accommodation portion 62 can flow into the oil pool P.

Next, the configuration of the second housing member 52 will be described. The second housing member 52 is attached to the +Y direction side of side plate portion 512 of the first housing member 51. The second housing member 52 has a recessed shape that is open to the side plate portion 512 side. The opening of the second housing member 52 is covered with the side plate portion 512. As illustrated in FIG. 1 and the like, the second housing member 52 includes the second gear bearing holding portion 521, the fourth gear bearing holding portion 522, and the second drive shaft passage hole 523. Since these descriptions have been made previously, they are omitted here.

The second housing member 52 includes a saucer portion 524, a gear-side oil passage 525, and a gear-side restricting member 526. In other words, the housing 5 includes the saucer portion 524, the gear-side oil passage 525, and the gear-side restricting member 526.

The saucer portion 524 is disposed radially outward with respect to the fourth gear 321 based on the differential axis J5 and opens in the +Z direction (that is, vertically upward). The oil CL scraped up by the fourth gear 321 is stored in the saucer portion 524. The saucer portion 524 extends in the +Y direction from the side plate portion 512. The end portion of the saucer portion 524 on the +Y direction side is connected to the inner surface of the second housing member 52 facing the −Y direction.

The gear-side oil passage 525 is formed inside the second housing member 52. The gear-side oil passage 525 is the passage of the oil CL for connecting the end portion of the saucer portion 524 on the +Y direction side and the second gear bearing holding portion 521. Further, one end of an oil passage 627 is connected to the end portion of the saucer portion 524 on the +Y direction side and is connected to the saucer portion 524. The other end of the gear-side oil passage 525 is connected to the second gear bearing holding portion 521. The oil CL stored in the saucer portion 524 is supplied to the gear-side oil passage 525. As illustrated in FIG. 2, a part of the oil CL supplied to the gear-side oil passage 525 is supplied to the second gear bearing 342. Further, the other part of the oil CL supplied to the gear-side oil passage 525 flows into the hollow portion 3101 from the end portion of the transmission shaft 310 on the +Y direction side and flows in the −Y direction, and flows into the hollow portion 220 of the motor shaft 22.

The gear-side restricting member 526 restricts the amount of the oil CL supplied from the gear-side oil passage 525 to the second gear bearing 342. Due to this restriction, the oil CL supplied from the gear-side oil passage 525 to the hollow portion 220 of the motor shaft 22 through the hollow portion 3101 of the transmission shaft 310 can be secured. The gear-side restricting member 526 includes an annular portion (reference numeral omitted) facing the second gear bearing 342 in the Y axis direction and a tubular portion (reference numeral omitted) which extends in the −Y direction from the radially inner end portion of the annular portion and is inserted into the transmission shaft 310. The annular portion includes a through hole (reference numeral omitted) that penetrates the annular portion in the Y axis direction. The oil CL is supplied to the second gear bearing 342 through the through hole and is supplied into the transmission shaft 310 through the tubular portion.

Figure 7:
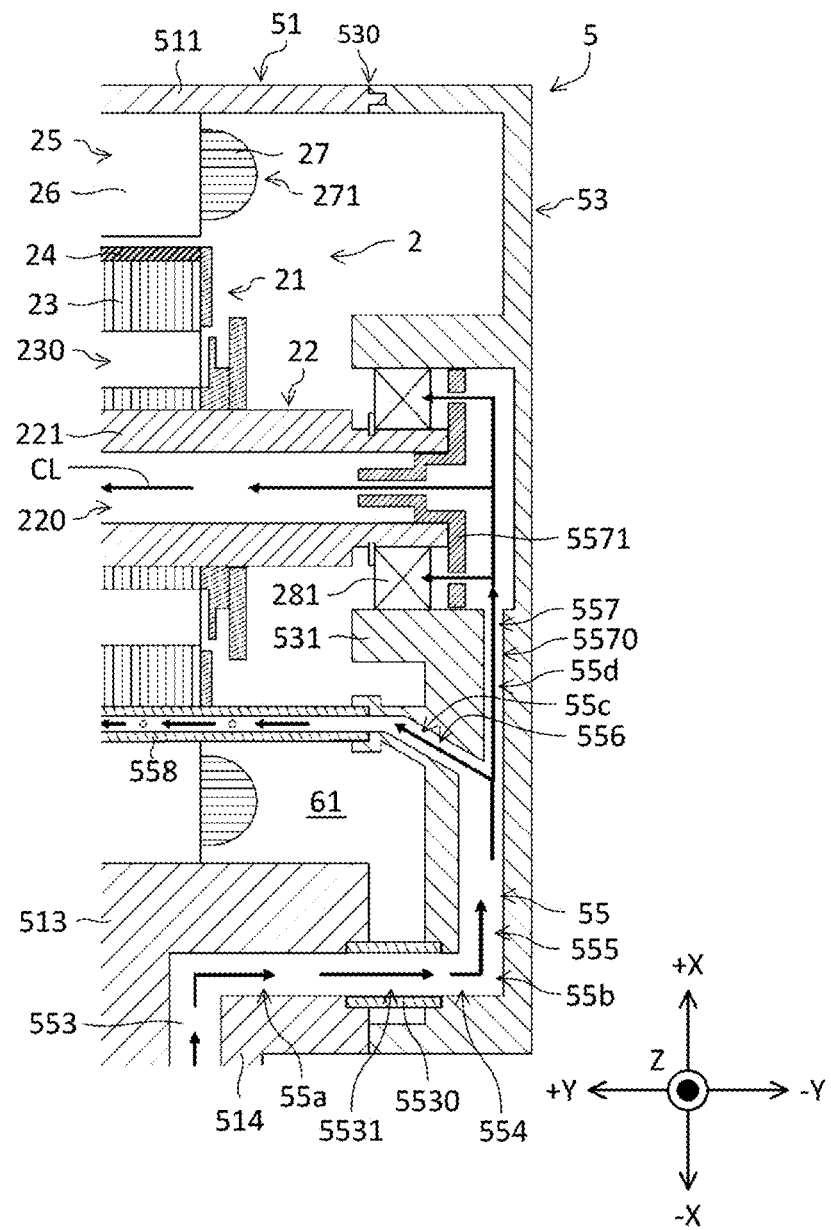
FIG. 7 is a schematic view illustrating a configuration example of an oil passage on a motor side.

Next, the motor-side oil passage 55 will be described with reference to FIGS. 1 to 3 and FIG. 7. FIG. 7 is a schematic view illustrating a configuration example of the motor-side oil passage 55. Note that FIG. 7 is viewed from the +Z direction to the −Z direction.

Next, for example, as illustrated in FIGS. 1 to 3, the housing 5 further includes the motor-side oil passage 55 through which the oil CL flows. The motor-side oil passage 55 is an example of the "refrigerant flow path" of the present invention. Further, the oil CL is a lubricating liquid and is an example of the "refrigerant" of the present invention. A part of the motor-side oil passage 55 is disposed in the first housing member 51, and the rest part is disposed in the third housing member 53. The motor-side oil passage 55 is a flow path through which the oil CL sucked up from the oil pool P of the gear accommodation portion 62 by the pump 4 and cooled by the oil cooler 8 flows toward the motor portion 2.

The motor-side oil passage 55 includes the first oil passage 551, the second oil passage 552, the third oil passage 553, and the fourth oil passage 554. The first oil passage 551, the second oil passage 552, and the third oil passage 553 are formed in the first housing member 51.

As described above, the first oil passage 551 connects the gear accommodation portion 62 and the suction port 41 of the pump 4, and particularly connects the vertically lower portion of the gear accommodation portion 62 and the suction port 41 of the pump 4. In the present embodiment, the first oil passage 551 is formed inside the side plate portion 512.

The second oil passage 552 connects the discharge port 43 of the pump 4 and the oil cooler 8, and supplies the oil CL discharged from the pump 4 to the oil cooler 8. The third oil passage 553 is connected to the fourth oil passage 554 via a connection flow path 5531 described later. The second oil passage 552 and the third oil passage 553 constitute a first flow path 55a. The motor-side oil passage 55 includes the first flow path 55a through which the oil CL sent from the pump 4 flows. The first flow path 55a is disposed in the first housing member 51.

The second oil passage 552 and the third oil passage 553 (first flow path 55a) are disposed in either the plate portion 513 or the peripheral wall portion 514. For example, in the embodiment, the second oil passage 552 and the third oil passage 553 are formed inside the peripheral wall portion 514. However, the present invention is not limited to this example, and at least one of the second oil passage 552 and the third oil passage 553 (first flow path 55a) may be formed inside the plate portion 513. In this way, for example, the second oil passage 552 and the third oil passage 553 (first flow path 55a) can be disposed by using the dead space other than the space occupied by the inverter unit 7 in the inverter accommodation portion 63. Therefore, since the motor-side oil passage 55 can be disposed compactly, it can contribute to the miniaturization of the drive device 1.

The fourth oil passage 554 connects the third oil passage 553 and the motor accommodation portion 61. The fourth oil passage 554 is disposed in the third housing member 53. In other words, the fourth oil passage 554 is a through hole formed in the third housing member 53. In this way, the fourth oil passage 554 can be disposed without increasing the number of parts of the drive device 1.

Further, the motor-side oil passage 55 further includes the connection flow path 5531. The connection flow path 5531 connects the third oil passage 553 (first flow path 55a) and the fourth oil passage 554 (second flow path 55b) in the motor accommodation portion 61. Further, when viewed from the axial direction, the connection flow path 5531 is disposed inside the contact portion 530 between the first housing member 51 and the third housing member 53 (see, for example, FIG. 3). In this way, a part of the connection flow path 5531 can be reliably disposed in the motor accommodation portion 61.

In the present embodiment, the end portion of the third oil passage 553 (first flow path 55a) and the end portion of the fourth oil passage 554 (second flow path 55b) connected by the connection flow path 5531 face each other with a gap therebetween. In this way, the connection flow path 5531 can be configured in a simple manner.

The connection flow path 5531 is a space surrounded by the inner side surface of a connection pipe 5530. The housing 5 includes a tubular connection pipe 5530 that connects the third oil passage 553 (first flow path 55a) and the fourth oil passage 554 (second flow path 55b). The connection pipe 5530 extends in the Y axis direction.

The fourth oil passage 554 includes a first supply passage 555, a second supply passage 556, and a third supply passage 557. The first supply passage 555 is connected to the third oil passage 553 via the connection flow path 5531. The second supply passage 556 connects the first supply passage 555 and an oil supply portion 558. The third supply passage 557 connects the first supply passage 555 and the hollow portion 220 of the motor shaft 22. That is, one end portion of the fourth oil passage 554 is the first supply passage 555, and the other end portion of the fourth oil passage 554 branches into the second supply passage 556 and the third supply passage 557.

In other words, the motor-side oil passage 55 includes the first supply passage 555. The first supply passage 555 constitutes the second flow path 55b. The motor-side oil passage 55 includes the second flow path 55b. The oil CL supplied to the motor portion 2 flows through the first supply passage 555 (second flow path 55b).

Further, the motor-side oil passage 55 further includes the second supply passage 556 and the third supply passage 557. The second supply passage 556 constitutes the third flow path 55c, and the third supply passage 557 constitutes the fourth flow path 55d. The motor-side oil passage 55 includes the third flow path 55c and the fourth flow path 55d. The second supply passage 556 (third flow path 55c) supplies a part of the oil CL flowing through the first supply passage 555 (second flow path 55b) to the outer surface of the stator 25. The third supply passage 557 (fourth flow path 55d) supplies another part of the oil CL flowing through the first supply passage 555 (second flow path 55b) to the hollow portion 220 of the motor shaft 22. The third supply passage 557 also supplies the oil CL to the first motor bearing 281.

The first supply passage 555 (second flow path 55b), the second supply passage 556 (third flow path 55c), and the third supply passage 557 (fourth flow path 55d) are disposed in the third housing member 53. In this way, the first supply passage 555 (second flow path 55b), the second supply passage 556 (third flow path 55c), and the third supply passage 557 (fourth flow path 55d) can be disposed without increasing the number of parts of the drive device 1.

Further, the second supply passage 556 (third flow path 55c) and the third supply passage 557 (fourth flow path 55d) extend in a direction intersecting the Y axis direction. In this way, it is possible to suppress an increase in the size of the third housing member 53 in the Y axis direction due to the arrangement of the second supply passage 556 (third flow path 55c) and the third supply passage 557 (fourth flow path 55d).

The minimum flow-path cross-sectional area in the third supply passage 557 (fourth flow path 55d) is smaller than the minimum flow-path cross-sectional area in the second supply passage 556 (third flow path 55c). The minimum flow-path cross-sectional area of the third supply passage 557 (fourth flow path 55d) that supplies the oil CL to the hollow portion 220 of the motor shaft 22 is smaller than the minimum flow-path cross-sectional area in the second supply passage 556 (third flow path 55c) that supplies the oil CL to the outside of the stator 25. Therefore, the oil CL flowing through the first supply passage 555 (second flow path 55b) becomes easier to flow to the second supply passage 556 (third flow path 55c) than the third supply passage 557 (fourth flow path 55d). Therefore, even if the flow pressure of the oil CL flowing through the motor-side oil passage 55 is not increased so much, a sufficient amount of the oil CL flows through the second supply passage 556 (third flow path 55c) so that the oil can be supplied to the outer surface of the stator 25.

The third supply passage 557 (fourth flow path 55d) includes a hole 5570. The hole 5570 extends from the first supply passage 555 (second flow path 55b) and is disposed inside the third housing member 53. The hole 5570 communicates from the first supply passage 555 (second flow path 55b) to the first motor bearing holding portion 531. One end portion of the hole 5570 is connected to the first supply passage 555 (second flow path 55b). The other end portion of the hole 5570 is connected to the inside of the first motor bearing holding portion 531. Preferably, the minimum flow-path cross-sectional area of the hole 5570 is smaller than the minimum flow-path cross-sectional area in the second supply passage 556 (third flow path 55c). In this way, the amount of the oil CL supplied to the hollow portion 220 of the motor shaft 22 can be adjusted by adjusting the minimum flow-path cross-sectional area of the hole 5570. However, this example does not exclude the configuration in which the minimum flow-path cross-sectional area of the hole 5570 is equal to or larger than the minimum flow-path cross-sectional area in the second supply passage 556 (third flow path 55c).

Next, the second supply passage 556 (third flow path 55c) is connected to the oil supply portion 558. The oil supply portion 558 is accommodated in the motor accommodation portion 61 together with the motor portion 2. The drive device 1 further includes the oil supply portion 558. The oil supply portion 558 is a tubular member extending in the Y axis direction, and is disposed radially outward from the stator 25 and vertically above the rotation axis J2 (that is, in the +Z direction). The inside of the oil supply portion 558 is connected to the second supply passage 556 (third flow path 55c). Further, the inside of the oil supply portion 558 is connected to the third gear bearing holding portion 518 via a hole 5121 that penetrates the side plate portion 512 in the Y axis direction.

The oil supply portion 558 includes a spray hole 5581. The spray hole 5581 penetrates from the inner side surface of the oil supply portion 558 to the outer surface and opens toward the outer surface of the stator 25. In this way, the oil supply portion 558 can spray the oil CL flowing through the third supply passage 557 (fourth flow path 55d) from the spray hole 5581 toward the outer surface of the stator 25, and the stator 25 can be cooled from the radially outer surface.

Figure 8:
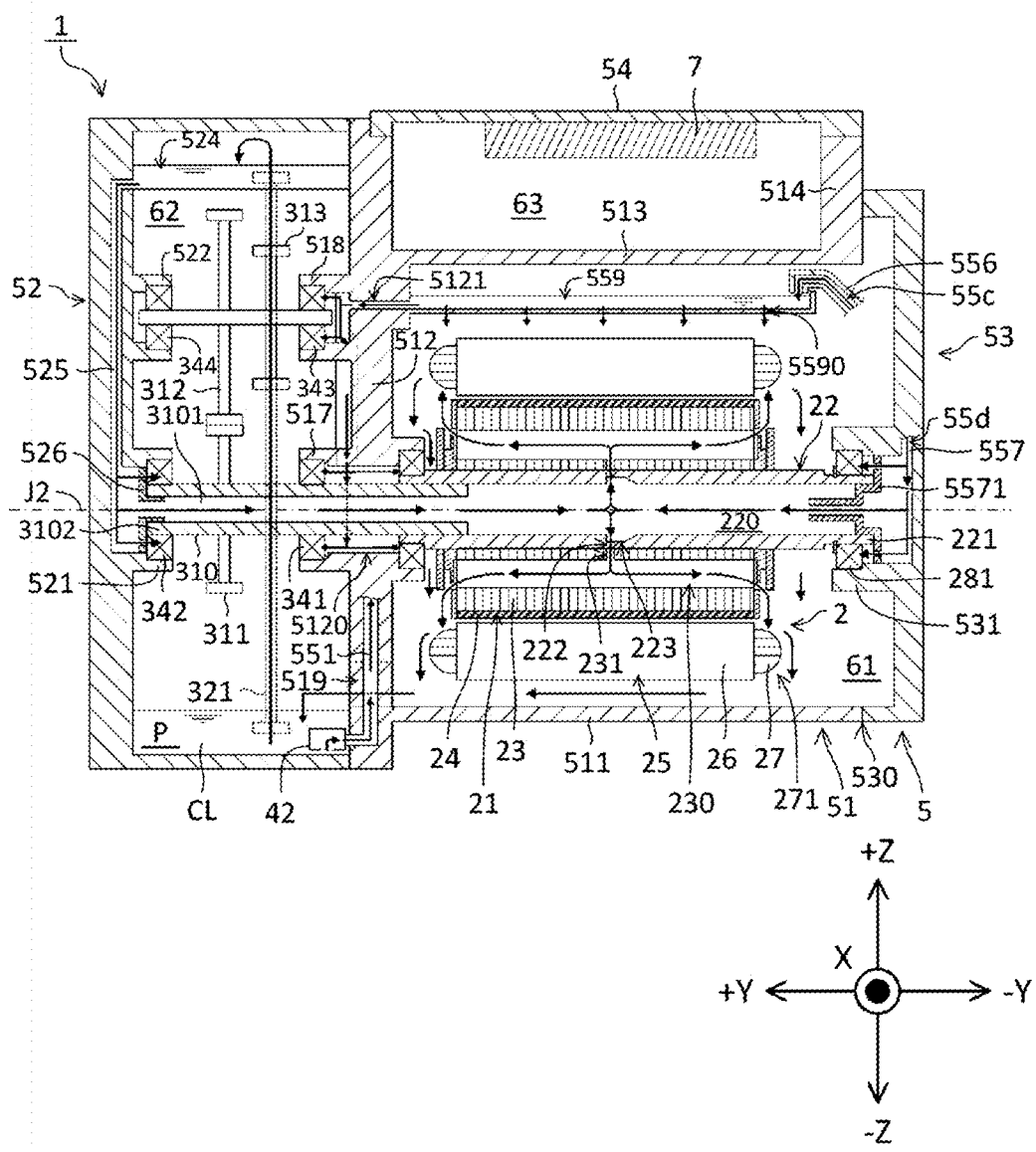
FIG. 8 is a schematic view illustrating another configuration example of the drive device.

The configuration for supplying the oil CL supplied from the second supply passage 556 (third flow path 55c) to the outer surface of the stator is not limited to the above example. FIG. 8 is a schematic view illustrating another configuration example of the drive device 1. Note that FIG. 8 shows the drive device 1 from the X axis direction. As illustrated in FIG. 8, the second supply passage 556 (third flow path 55c) may be connected to a motor oil reservoir 559 instead of the oil supply portion 558. The motor oil reservoir 559 is a tray disposed above the motor accommodation portion 61 and opened vertically upward (that is, in the +Z direction). A motor oil reservoir 74 is disposed vertically above the stator 25 in the motor accommodation portion 61. A dropping hole 5590 is formed at the bottom of the motor oil reservoir 74. The motor portion 2 can be cooled by dropping the oil CL from the dropping hole 5590. The dropping hole 5590 is formed, for example, on the upper part of the coil end 271 of the stator 25. The coil end 271 is cooled by the oil CL dropped from the dropping hole 5590.

Next, the third supply passage 557 (fourth flow path 55d) is connected to the hollow portion 220 of the motor shaft 22 via the first motor bearing holding portion 531. As described above, the hollow portion 220 of the motor shaft 22 is connected to the rotor through hole 230 of the rotor core 23. For example, the hollow portion 220 of the motor shaft 22 is connected to the rotor through hole 230 via the recess portion 223, the shaft hole portion 222, and the rotor communication portion 231 (see FIG. 5). That is, the rotor through hole 230 is connected to the second supply passage 556 (third flow path 55c) via the first motor bearing holding portion 531 and the hollow portion 220. Therefore, when the rotor 21 rotates, the oil CL is supplied from the end portion of the rotor through hole 230 in the Y axis direction to the end portion of the stator 25 in the Y axis direction. Thus, the end portion of the stator 25 in the Y axis direction can be cooled by the oil CL supplied from the rotor through hole 230, and in particular, the coil end 271 of the stator 25 can be cooled.

The oil CL having cooled the motor portion 2 accumulates in the lower portion of the motor accommodation portion 61 and then flows to the oil pool P in the lower portion of the gear accommodation portion 62 through the side plate opening 519. That is, the oil CL supplied from the second supply passage 556 (third flow path 55c) to the radial outside surface of the stator 25 via the oil supply portion 558 and having cooled the stator 25 accumulates in the lower portion of the motor accommodation portion 61, and then flows to the oil pool P in the lower portion of the gear accommodation portion 62 through the side plate opening 519. The oil CL supplied from the third supply passage 557 (fourth flow path 55d) to the coil end 271 and the like via the rotor through hole 230 accumulates in the lower portion of the motor accommodation portion 61, and then flows to the oil pool P in the lower portion of the gear accommodation portion 62 through the side plate opening 519.

In the third supply passage 557 (fourth flow path 55d), a supply restricting member 5571 that restricts the supply amount of the oil CL to the hollow portion 220 is disposed. As illustrated in FIG. 7, in the first motor bearing holding portion 531, the supply restricting member 5571 is disposed at the end portion of the shaft tubular portion 221 on the −Y direction side. The drive device 1 includes the supply restricting member 5571. The end portion on the −Y direction side is an example of the "one axial end portion" of the present invention.

Figure 9:
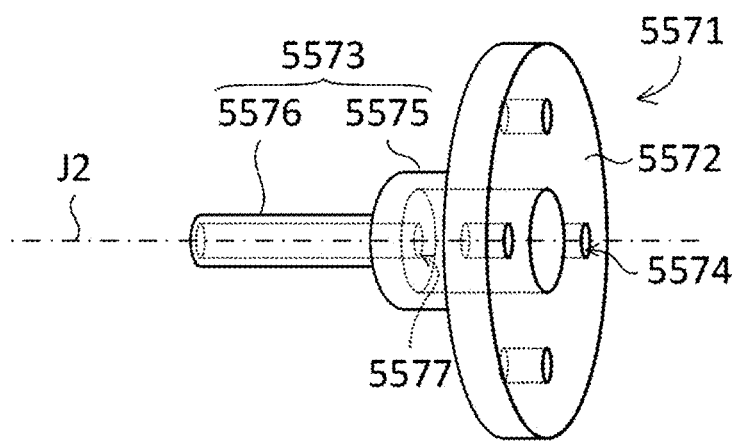
FIG. 9 is a perspective view of a supply restricting member.

FIG. 9 is a perspective view of the supply restricting member 5571. The supply restricting member 5571 includes an annular portion 5572 that extends in a direction intersecting the rotation axis J2, and a tubular restricting portion 5573 that extends in the +Y direction from the radially inner end portion of the annular portion 5572. The +Y direction is an example of the "other axial direction" of the present invention. The space surrounded by the inner peripheral surface of the restricting portion 5573 is a part of the third supply passage 557 (fourth flow path 55d). The minimum flow-path cross-sectional area in the restricting portion 5573 is smaller than the minimum flow-path cross-sectional area in the second supply passage 556 (third flow path 55c). In this way, by disposing the supply restricting member 5571 in the −Y direction of the shaft tubular portion 221, the amount of the oil CL supplied to the hollow portion 220 of the motor shaft 22 is restricted, and the oil CL can be stored on the −Y direction side with respect to the annular portion 5572. Further, by adjusting the flow-path cross-sectional area of the restricting portion 5573, the length in the Y axis direction, etc., the flow pressure, amount, etc. of the oil CL supplied to the hollow portion 220 of the motor shaft 22 can be adjusted. Therefore, by these adjustments, the oil CL can be supplied to the hollow portion 220 of the motor shaft 22 without interruption.

For example, in this embodiment, the ratio of the minimum flow-path cross-sectional area of the second supply passage 556 (third flow path 55c) to the minimum flow-path cross-sectional area of the restricting portion 5573 is 3:1. By making both the flow-path cross-sectional areas in this way, the oil CL can be supplied in a well-balanced manner to the supply restricting member 5571 and the hollow portion 220 of the motor shaft 22.

Preferably, the minimum flow-path cross-sectional area of the first supply passage 555 (second flow path 55b) is larger than the sum of the minimum flow-path cross-sectional area of the second supply passage 556 (third flow path 55c) and the minimum flow-path cross-sectional area of the third supply passage 557 (fourth flow path 55d). In this way, a sufficient amount of the oil CL can be supplied from the first supply passage 555 (second flow path 55b) to the second supply passage 556 (third flow path 55c) and the third supply passage 557 (fourth flow path 55d) without interruption. Therefore, it is possible to prevent the lowering of the flow pressure of the oil CL in the first supply passage 555 (second flow path 55b), the second supply passage 556 (third flow path 55c), and the third supply passage 557 (fourth flow path 55d), and this flow pressure can be increased. However, this example does not exclude the configuration in which the minimum flow-path cross-sectional area of the first supply passage 555 (second flow path 55b) is equal to or less than the sum of the minimum flow-path cross-sectional area of the second supply passage 556 (third flow path 55c) and the minimum flow-path cross-sectional area of the third supply passage 557 (fourth flow path 55d).

In the present embodiment, the annular portion 5572 extends in the radial direction with respect to the rotation axis J2. For example, when viewed from the Y axis direction, the radially inner end portion of the annular portion 5572 is disposed radially inward from the radially inner end portion at the end portion of the shaft tubular portion 221 on the −Y direction side. On the other hand, the radially outer end portion of the annular portion 5572 is disposed radially outward of the shaft tubular portion 221. The annular portion 5572 faces the first motor bearing 281 in the Y axis direction. In this way, the amount of the oil CL supplied from the third supply passage 557 (fourth flow path 55d) to the first motor bearing 281 can be restricted by the annular portion 5572.

Preferably, as illustrated in FIG. 9, the annular portion 5572 includes a through hole 5574 penetrating in the Y axis direction. In this embodiment, four through holes 5574 are disposed at equal intervals in the circumferential direction about the rotation axis J2. However, the present invention is not limited to this example, and the number of the through holes 5574 may be one, or two or more except in addition to four. By disposing the through hole 5574 in the annular portion 5572, the amount of the oil CL supplied from the third supply passage 557 (fourth flow path 55d) to the first motor bearing 281 can be adjusted according to the diameter and number of the through holes 5574. It should be noted that this example does not exclude the configuration in which the through hole 5574 is not disposed in the annular portion 5572.

The restricting portion 5573 is inserted through the end portion of the shaft tubular portion 221 on the −Y direction side and is disposed in the hollow portion 220. The restricting portion 5573 includes a large-diameter tubular portion 5575 and a small-diameter tubular portion 5576 (see FIG. 9). The large-diameter tubular portion 5575 has a bottomed tubular shape and extends in the +Y direction from the radially inner end portion of the annular portion 5572. An opening 5577 is disposed at the bottom of the large-diameter tubular portion 5575 that extends in a direction intersecting the Y axis direction. The small-diameter tubular portion 5576 has a tubular shape and extends in the +Y direction from the outer edge portion of the opening 5577. When viewed from the Y axis direction, the diameter of the small-diameter tubular portion 5576 is smaller than the diameter of the large-diameter tubular portion 5575.

In the present embodiment, the minimum flow-path cross-sectional area of the small-diameter tubular portion 5576 is smaller than the minimum flow-path cross-sectional area in the second supply passage 556 (third flow path 55d). By doing so, the flow pressure, amount, etc. of the oil CL supplied to the hollow portion 220 of the motor shaft 22 can be adjusted by adjusting the flow-path cross-sectional area of the small-diameter tubular portion 5576, the length in the Y axis direction, and the like.

Figure 10:
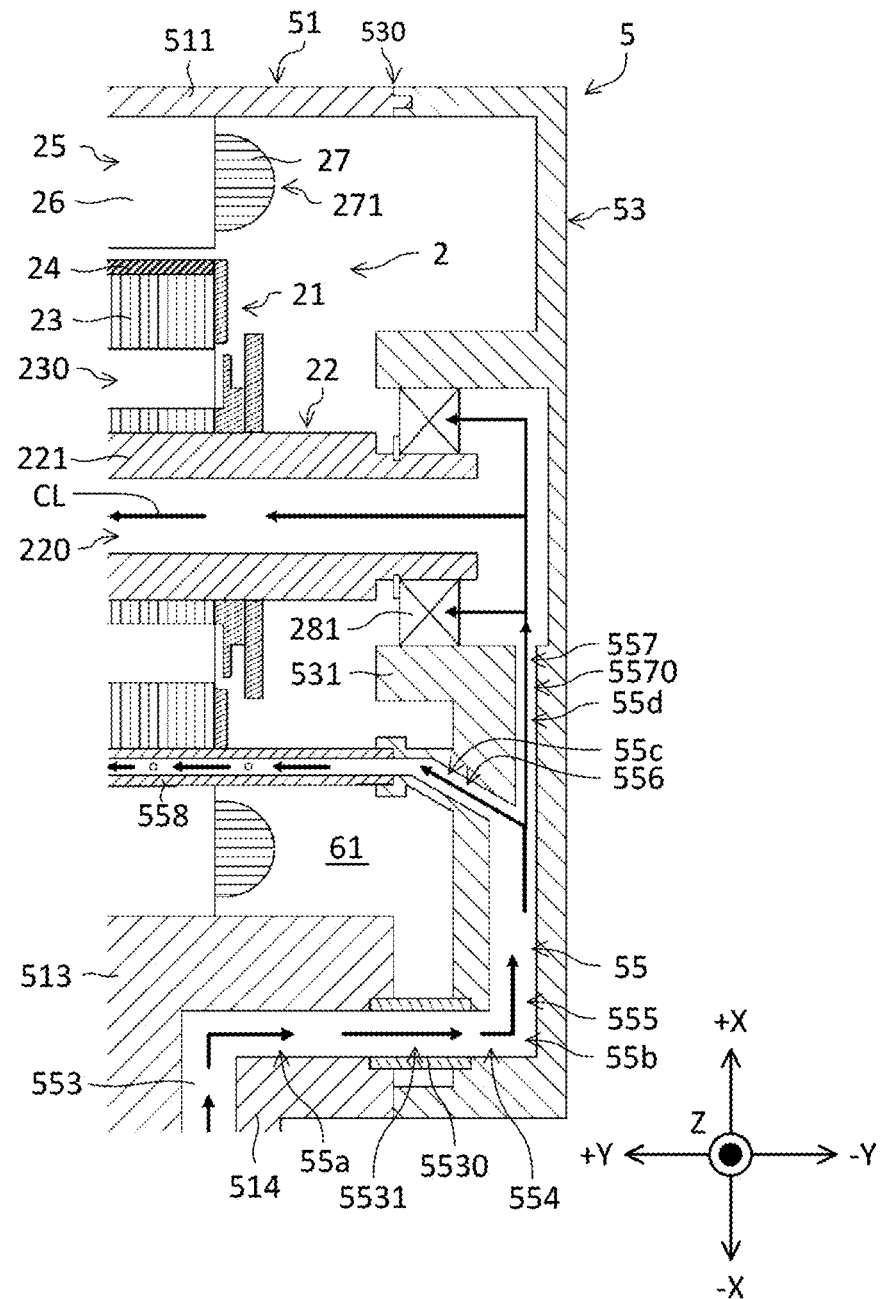
FIG. 10 illustrates a modification of a third supply passage.

In the above-described embodiment, the supply restricting member 5571 is disposed in the third supply passage 557 (fourth flow path 55d). However, the present invention is not limited to this example, and the supply restricting member 5571 may not be disposed in the third supply passage 557 (fourth flow path 55d). FIG. 10 illustrates a modification of the third supply passage 557 (fourth flow path 55d).

In FIG. 10, the minimum flow-path cross-sectional area of the hole 5570 is smaller than the minimum flow-path cross-sectional area in the second supply passage 556 (third flow path 55c). By adjusting the minimum flow-path cross-sectional area of the hole 5570 and the length from one end portion to the other end portion of the hole 5570, the amount of CL supplied to the hollow portion 220 of the motor shaft 22 can be adjusted.

Further, the ratio of the minimum flow-path cross-sectional area of the second supply passage 556 (third flow path 55c) to the minimum flow-path cross-sectional area of the hole 5570 is, for example, 3:1. By making the both flow-path cross-sectional areas in this way, the oil CL can be supplied in a well-balanced manner to the outer surface of the stator 25 and the hollow portion 220 of the motor shaft 22.

The embodiment of the present invention has been described above. Note that, the scope of the present invention is not limited to the above-described embodiment. The present invention can be implemented by making various modifications to the above-described embodiment without departing from the gist of the invention. In addition, the matters described in the above-described embodiment can be discretionarily combined as appropriate within a range where no inconsistency occurs.

The present invention is useful for a drive motor for a vehicle such as a hybrid vehicle (HV), a plug-in hybrid vehicle (PHV), and an electric vehicle (EV).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
   a motor portion that includes a rotor having a shaft rotatable about a rotation shaft extending along an axial direction, and a stator disposed radially outward of the rotor; and
   a housing for accommodating the motor portion,
   wherein the shaft includes:
   a shaft tubular portion that extends in the axial direction; and
   a hollow portion surrounded by an inner side surface of the shaft tubular portion, the housing includes:
a motor tubular portion that extends in the axial direction and surrounds the stator;
a motor lid portion attached to one axial end portion of the tubular portion,
a motor accommodation space that is surrounded by the motor tubular portion and accommodates the motor; and
a refrigerant flow path through which a refrigerant flows, the refrigerant flow path includes:
a first flow path through which the refrigerant to be sent from a pump flows;
a second flow path through which the refrigerant to be supplied to the motor portion flows;
a third flow path through which a part of the refrigerant flowing through the second flow path is supplied to an outer surface of the stator; and
a fourth flow path through which another part of the refrigerant flowing through the second flow path is supplied to the hollow portion of the shaft, and
a minimum flow-path cross-sectional area in the fourth flow path is smaller than a minimum flow-path cross-sectional area in the third flow path.

2. The drive device according to claim 1, further comprising:
a supply restricting member disposed in one axial end portion of the shaft tubular portion,
wherein the supply restricting member includes:
an annular portion that extends in a direction intersecting the rotation axis; and
a tubular restricting portion that extends from a radially inner end portion of the annular portion to the other axial direction,
the space surrounded by an inner peripheral surface of the restricting portion is a part of the fourth flow path, and
a minimum flow-path cross-sectional area in the restricting portion is smaller than a minimum flow-path cross-sectional area in the third flow path.

3. The drive device according to claim 2, wherein a ratio of a minimum flow-path cross-sectional area of the third flow path to a minimum flow-path cross-sectional area of the restricting portion is 3:1.

4. The drive device according to claim 2, wherein
the motor lid portion includes:
a bearing that rotatably supports the shaft tubular portion; and
a bearing holding portion that holds the bearing, and
the annular portion faces the bearing in an axial direction.

5. The drive device according to claim 4, wherein the annular portion includes a through hole penetrating in an axial direction.

6. The drive device according to claim 1, wherein
the fourth flow path includes a hole extending from the second flow path and disposed inside the motor lid portion, and
a minimum flow-path cross-sectional area of the hole is smaller than a minimum flow-path cross-sectional area of the third flow path.

7. The drive device according to claim 6, wherein
a ratio of a minimum flow-path cross-sectional area of the third flow path to a minimum flow-path cross-sectional area of the hole portion is 3:1.

8. The drive device according to claim 1, wherein a minimum flow-path cross-sectional area of the second flow path is larger than a sum of a minimum flow-path cross-sectional area of the third flow path and a minimum flow-path cross-sectional area of the fourth flow path.

9. The drive device according to claim 1, wherein
the housing further includes a motor lid portion that is attached to one axial end portion of the motor tubular portion, and
the second flow path, the third flow path, and the fourth flow path are disposed in the motor lid portion.

* * * * *